(No Model.)

G. F. CLINGMAN.
COMBINATION BUREAU AND CHEVAL GLASS.

No. 367,597. Patented Aug. 2, 1887.

Witnesses,
Fred H Mills
W Rowlen

Inventor.
George F. Clingman
By Wm H Lotz
Atty.

N. PETERS, Photo-Lithographer, Washington, D. C.

UNITED STATES PATENT OFFICE.

GEORGE F. CLINGMAN, OF CHICAGO, ILLINOIS.

COMBINATION BUREAU AND CHEVAL GLASS.

SPECIFICATION forming part of Letters Patent No. 367,597, dated August 2, 1887.

Application filed April 21, 1887. Serial No. 235,703. (No model.)

*To all whom it may concern:*

Be it known that I, GEORGE F. CLINGMAN, a citizen of the United States of America, residing at Chicago, in the county of Cook and State of Illinois, have invented certain new and useful Improvements in a Combination Bureau and Cheval Glass, of which the following is a specification, reference being had therein to the accompanying drawings.

This invention has for its object to so combine a cheval-mirror with a bureau that the bureau will form the base for the mirror, the latter being supported in a swinging framework thereon, that it can be moved forward to be in front of the bureau, and that at the same time it can be adjusted to any desired angle; and with that object in view my invention consists of the novel devices and combinations of devices hereinafter described and specifically claimed.

Figure 1:
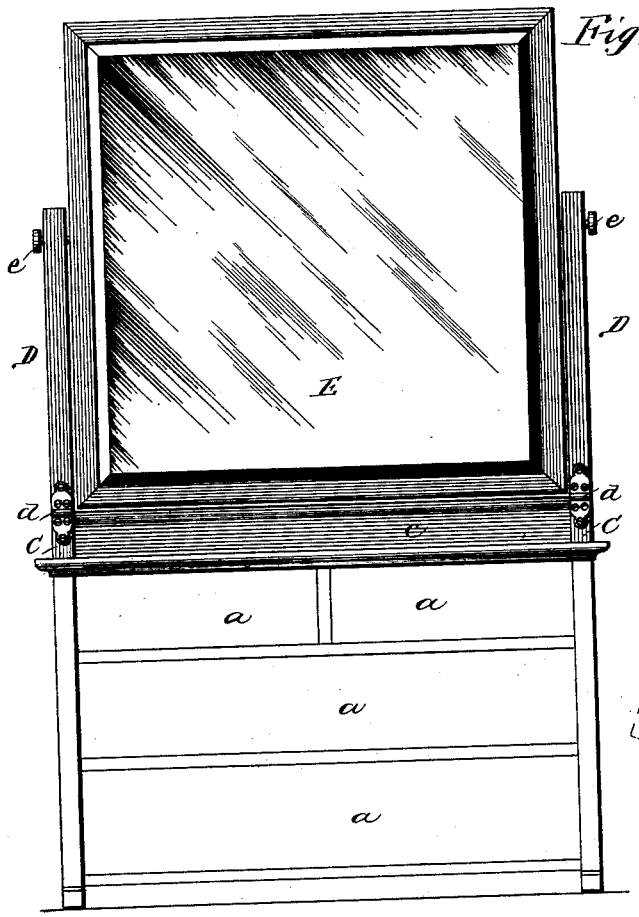
Figure 2:
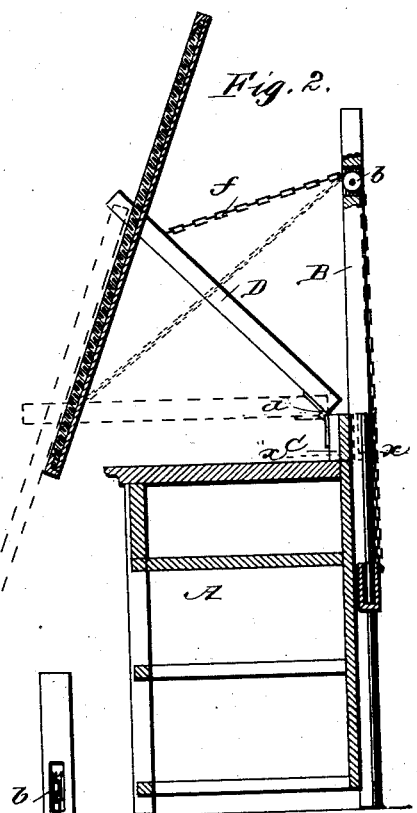
Figure 3:
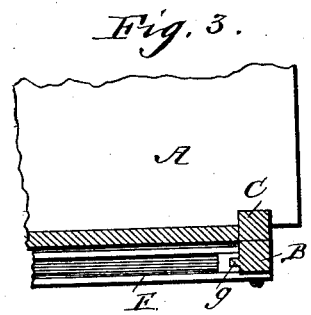
Figure 4:
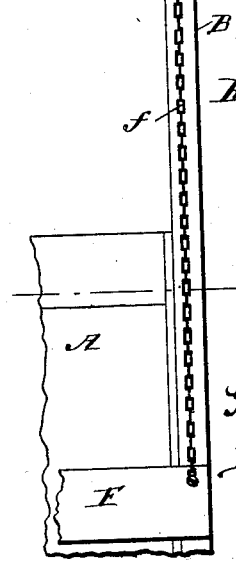

In the accompanying drawings, Figure 1 represents a front elevation of the device with the glass in its usual position; Fig. 2, a transverse vertical section of the same, showing the mirror on two positions of adjustment. Fig. 3 is a sectional plan of one corner of the bureau, and Fig. 4 a rear elevation of one side of the same.

Corresponding letters in the several figures of the drawings designate like parts.

A denotes the bureau of any usual construction, with drawers $a$. Against the rear corners of this bureau are secured standards B, the lower ends of which form the hind feet for the bureau, and their upper ends extend above the bureau and have slotted openings in their upper portions occupied by pulleys $b$. Against posts B are secured, upon the top of the bureau A, blocks C, connected by a face board, $c$, and to these blocks C are connected by hinges $d$ bars D, that form vertical continuations of these blocks when on their upright positions, and are adapted to be swung forward to occupy angular or horizontal positions. Between the upper extremities of these bars D are pivotally secured by screws $e$ the frame side rails of the mirror E at a point little above the middle thereof, so as to be nearly on a balance therein.

To near the upper end of each bar D is coupled one end of a chain or cord, $f$, passing over pulley $b$, and the opposite ends of both chains or cords $f$ are connected to a bar or box, F, guided between standards B in tongues $g$, formed to the inward faces of such standards. This bar or box F is formed U-shaped in cross-section for inserting therein additional weights, if necessary, for counterbalancing the bars D and mirror E, and thereby sustaining the mirror on any forwardly-turned position, as shown by full and dotted lines in Fig. 2. By this arrangement, as will be noticed, the mirror may occupy either a vertical position above the back of the bureau, or it may be swung with ease to be in front of the bureau, and at the same time it may be adjusted to any angular position most desirable for showing the whole figure of the lady using it.

What I claim is—

The combination, with a bureau provided at its rear with rigid standards having sheaves in their upper ends, of a mirror pivotally suspended between swinging bars hinged to the rear of the bureau-top, and of chains or cords guided over such sheaves and connecting the swinging arms with a counterbalance-weight, substantially as described, to operate as specified.

In testimony whereof I affix my signature in presence of two witnesses.

GEORGE F. CLINGMAN.

Witnesses:
 WILLIAM H. LOTZ,
 OTTO LÜBKERT.